(12) United States Patent
Obersteiner

(10) Patent No.: US 6,418,837 B1
(45) Date of Patent: Jul. 16, 2002

(54) KITCHEN APPLIANCE HAVING A CONTAINER AND HAVING A COVER CONFIGURATION FOR CLOSING THE CONTAINER

(75) Inventor: Heimo Obersteiner, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/932,083

(22) Filed: Aug. 17, 2001

(30) Foreign Application Priority Data

Aug. 23, 2000 (EP) .............................. 00890256

(51) Int. Cl.[7] .............................. A23L 1/00; A23N 1/02; A47J 43/06; A47J 43/07; B02C 18/16
(52) U.S. Cl. .............................. 99/509; 99/492; 99/510; 99/348; 241/37.5; 241/92; 241/101.01; 241/282.1; 366/291; 366/314
(58) Field of Search .................. 99/348, 492, 509–513, 99/484; 241/37.5, 92, 282.1, 101.01, 282.2, 101.2; 248/605, 612, 634; 366/314, 601, 291, 297–300, 205; 426/443, 478, 601

(56) References Cited

U.S. PATENT DOCUMENTS

| | | | | |
|---|---|---|---|---|
| 2,284,155 A | * | 5/1942 | Landgraf | 241/282.1 X |
| 3,024,010 A | * | 3/1962 | Sperling | 366/314 X |
| 3,156,278 A | * | 11/1964 | Ott | 241/282.2 |
| 4,613,086 A | * | 9/1986 | Granum et al. | 241/101.2 X |
| 4,784,338 A | * | 11/1988 | Saladin | 241/199.7 X |
| 5,271,572 A | * | 12/1993 | Grandi | 241/199.12 X |
| 5,823,672 A | * | 10/1998 | Barker | 366/314 X |
| 6,012,837 A | * | 1/2000 | Thuma | 99/348 X |
| 6,095,677 A | * | 8/2000 | Karkos, Jr. et al. | 366/274 |
| 6,164,196 A | * | 12/2000 | Deschamps et al. | 99/492 X |
| 6,189,441 B1 | * | 2/2001 | Beaudet et al. | 99/510 X |

OTHER PUBLICATIONS

Philips Journal 1999, Philips Kuchenmaschine Facilio, HR7727.

* cited by examiner

Primary Examiner—Timothy F. Simone
(74) Attorney, Agent, or Firm—Ernestine C. Bartlett

(57) ABSTRACT

A kitchen appliance (1) having a container (10) and having a first cover configuration (21) for closing the container (12) advantageously also includes a second cover configuration (25) which can be placed onto the first cover configuration (21), as a result of which a hollow space (29) is formed with the aid of the two cover configurations (21, 25), which hollow space serves to and is adapted to accommodate accessories (31, 32) of the kitchen appliance (1).

4 Claims, 2 Drawing Sheets

KITCHEN APPLIANCE HAVING A CONTAINER AND HAVING A COVER CONFIGURATION FOR CLOSING THE CONTAINER

The invention relates to a kitchen appliance having a container for holding a substance to be processed and having a cover configuration for closing the container.

Such a kitchen appliance of the type defined in the opening paragraph is known in many versions. Such a kitchen appliance has been put on the market by the Applicant under the type designation HR 7727. For such a kitchen appliance it is desired to find a simple solution for keeping and storing accessories of the kitchen appliance. Keeping and storing such accessories of the kitchen appliance is possible, for example, with the aid of a separate storage container but this is comparatively expensive and also has the disadvantage that the separate storage container is stored separately from the kitchen machine and should consequently be found first when the kitchen appliance is to be used.

It is an object of the invention to provide a simple, efficient and low-cost solution for keeping and storing accessories of a kitchen appliance of the type defined in the opening paragraph and thus provide an improved kitchen appliance.

In order to achieve this object characteristic features in accordance with the invention have been provided in a kitchen appliance in accordance with the invention, in such a manner that a kitchen appliance in accordance with the invention can be characterized in the manner defined hereinafter, namely:

A kitchen appliance having a container for holding a substance to be processed, which container has a bottom wall and at least a circumferential wall and container rim, which borders an opening for access to a container interior, and having a first cover configuration for closing the container, which first cover configuration has a cover rim, which cooperates with the container, and a cover wall, which extends across the access opening, and in which a second cover configuration has been provided, which second cover configuration has a cover rim and a cover wall, which extends across the first cover configuration, and in which the first cover configuration and the second cover configuration together bound a hollow space, and in which the hollow space serves to and is adapted to accommodate at least one accessory of the kitchen appliance.

Owing to the provision of the measures in accordance with the invention a suitable possibility of keeping and storing accessories of a kitchen appliance in accordance with the invention is obtained in a simple and space-saving manner and at only low additional cost, while it is guaranteed that the stored accessories are always accommodated in the constructional unit formed by the two cover configurations. The two cover configurations can advantageously be made of a transparent material, which has the advantage that the stored accessories are always visible.

In a kitchen appliance in accordance with the invention the accessories of the kitchen appliance may be accommodated loosely in the hollow space between the first cover configuration and the second cover configuration. However, it has proved to be very advantageous when in a kitchen appliance in accordance with the invention at least one of the cover configurations has holding means for holding accessories. This enables the accessories to be kept and stored in an orderly manner and, furthermore, it is precluded that undesirable noise is produced by loose accessories.

In a kitchen appliance in accordance with the invention the second cover configuration as well as the first cover configuration may be connected directly to the container of the kitchen appliance. However, it has proved to be very advantageous when the second cover configuration is placed upon the first cover configuration. This is advantageous in view of a construction which is as simple as possible. Furthermore, it is advantageous because as a result of this both the second cover configuration alone and the constructional unit consisting of the two cover configurations can be detached simply and easily from the container of the kitchen appliance in accordance with the invention.

The aforementioned aspects as well as further aspects of the invention will be apparent from the examples of embodiments described hereinafter and will be elucidated with the aid of these examples.

The invention will be described in more detail hereinafter with reference to three embodiments which are shown in the drawings by way of example but to which the invention is not limited.

Figure 1:
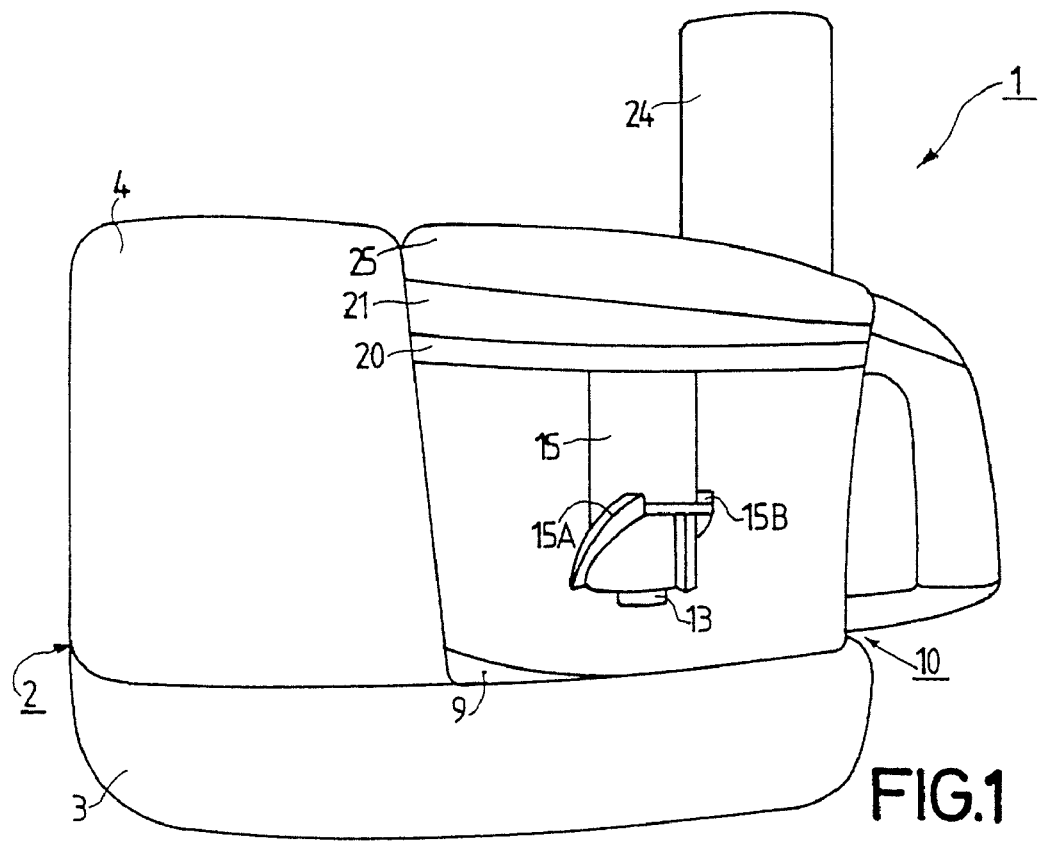
FIG. 1 shows diagrammatically a side view of a kitchen appliance in a first embodiment of the invention, which includes a container closed with the aid of a first cover configuration and a second configuration.

FIG. 1 shows a kitchen appliance 1. The kitchen appliance 1 has a housing which is substantially L-shaped in side view and which includes a base part 3 and a tower-shaped side part 4. The side part 4 accommodates a drive motor, not shown, by which drive means, which are mainly accommodated in the base part 3 and which are partly shown in FIG. 2, can be driven. The drive means include a drive belt 5, with the aid of which a pulley 6 is rotationally drivable about an axis 7. A drive mandrel 8 is rotationally drivable with the aid of the pulley 6 and extends through an upper wall 9 of the base part 3 of the housing 2 and which projects from the upper wall 9.

Figure 2:
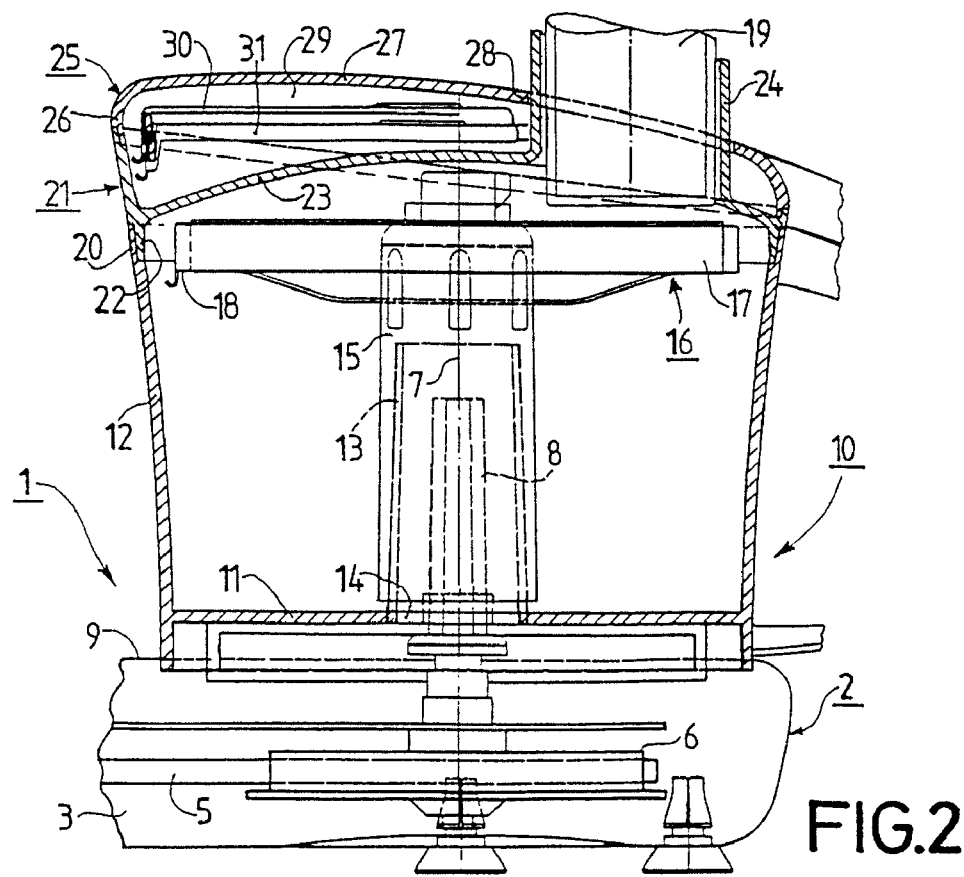
FIG. 2 is a sectional view of that part of the kitchen appliance of FIG. 1 which includes the container as well as the two cover configurations.

The kitchen appliance 1 further includes a container 10 which serves to contain substances to be processed. The container 10 has a bottom wall 11 and a basically imperforate circumferential wall 12 of substantially circular cross-sectional shape. In the area of the bottom wall 11 a sealing turret 13 is connected to the container 10 and surrounds a passage 14 in the bottom wall 11 of the container 10 and thereby prevents the substance to be processed from escaping through the passage 14 in the bottom wall 11. A drive turret 15 is placed over the sealing turret 13 and is in driving engagement with the drive mandrel 8 in a manner not shown, as a result of which the drive turret 15 is rotationally drivable with the aid of the drive mandrel 8 when the container 10 is placed on the upper wall 9 of the base part 3. The drive turret 15, which has coupling ribs 15a and 15b as is shown in FIG. 1, can engage with and can drive different stirring tools and mixing tools as well as cutting tools. As is shown in FIG. 2, the drive turret 15 can engage with and can drive, inter alia, a substantially circular cutting disc 16. The cutting disc 16 consists of a substantially circular disc-shaped plastic holder part 17, to which a metal cutter 18 can be connected. By means of the cutting disc 16 a substance to be sliced, for example a cucumber 19, which is shown schematically in FIG. 2, can be cut simply into slices, the slices falling into the container 10 and being collected therein.

At the side of the circumferential wall 12 remote from the bottom wall 11 the container 10 has a container rim 20. The container rim 20 borders an opening which gives access to the interior of the container.

For the closure of the container 10 the kitchen appliance 1 has a first cover configuration 21. The first cover configuration 21 has a cover rim 22, which cooperates with the container 10 in the area of its container rim 20, and a cover wall 23, which extends across the access opening to the container interior. A hollow cylindrical feed-in tube 24 projects from the cover wall 23, into which feed-in tube a substance to be sliced, for example the cucumber 19, can be inserted.

Advantageously, the kitchen appliance 1 shown in FIGS. 1 and 2 in addition has a second cover configuration 25. The second cover configuration 25 also has a cover rim 26. The second cover configuration 25 further has a cover wall 27, which extends across the cover wall 23 of the first cover configuration 21. The cover wall 27 of the second cover configuration 25 is formed with an opening 28, through which the feed-in tube 24, which projects from the first cover configuration 21, extends.

In the kitchen appliance 1 shown in FIGS. 1 and 2 the first cover configuration 21 and the second configuration 25 together bound a hollow space 29. In the present case, the hollow space 29 serves to and is adapted to accommodate two accessories of the kitchen appliance 1, namely to accommodate two cutters 30 and 31, which can optionally be attached to the holder part 17 of the cutting disc 16, instead of the cutter 18. The second cover configuration 25 has holding means, which are not shown in FIG. 2 and with the aid of which the two cutters 30 and 31 can be retained.

In this way, it is achieved that in a simple and space-saving manner and at only low additional cost a suitable possibility is created for storing the two cutters 30 and 31 in the hollow space 29 between the two cover configurations 21 and 25, as a result of which the two cutters 30 and 31, on the one hand, are protected properly and, on the other hand, are always available at the location of the kitchen appliance 1.

With regard to the construction of the container 10 and of the first cover configuration 21 as well as the second cover configuration 25 it is to be noted that the construction is such that the second cover configuration 25 is placed on top of the first cover configuration 21 and is connected to the first cover configuration 21, namely with the aid of a clamping means that acts between the two cover configurations 21 and 25. Thus, with this construction only the first cover configuration 21 is connected, in the area of the cover rim 22, to the container 10 in the area of the container rim 20. As a result of this, it is achieved that the second cover configuration 25 can be detached from the first cover configuration 21 by simply disengaging the clamping means between the second cover configuration 25 and the first cover configuration 21 and that subsequently said second configuration 25 can be moved away from the first cover configuration 21 along the feed-in tube 24, after which the first cover configuration 25 can be turned through 180°, as a result of which the cutters 30 and 31, which are retained with the aid of holding means, not shown, in the second cover configuration 25, are readily and simply accessible and, consequently, at least one of these two cutters 30 and 31 can be removed from the second cover configuration 25.

Figure 3:
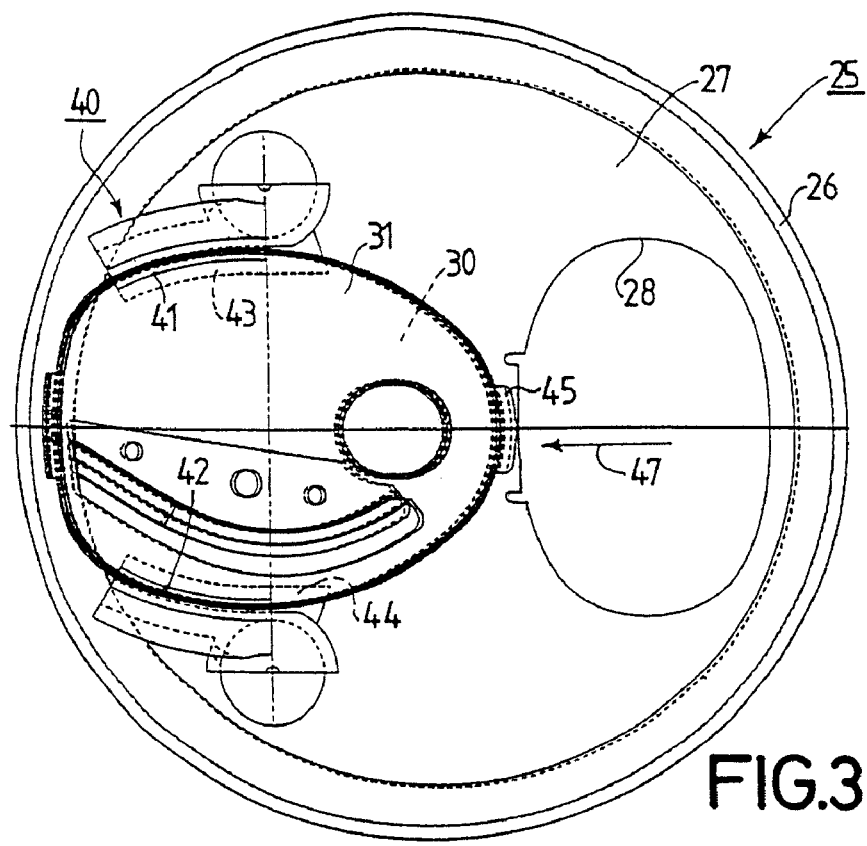
FIG. 3 is an underneath view which shows a second cover configuration of a kitchen appliance in a second embodiment of the invention.
Figure 4:
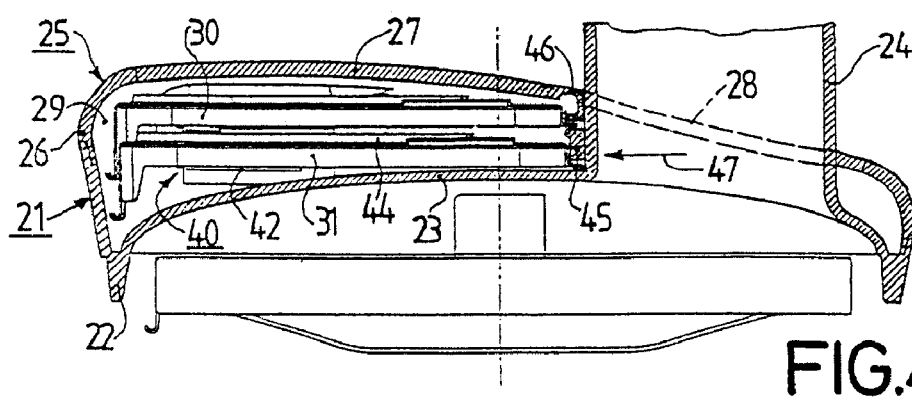
FIG. 4 is a cross-sectional view which shows the second cover configuration of FIG. 3 as well as a first cover configuration of the kitchen appliance in the second embodiment of the invention.

With regard to the construction of a first cover configuration 21 and a second cover configuration 25 shown in FIGS. 3 and 4 for a second embodiment of a kitchen appliance, not shown, it is to be noted that this solution also provides holding means for the accessories, namely for the cutters 30 and 31, which in this case are shown in FIG. 3. Said holding means 40 include holding limbs 41, 42, 43 and 44, which are integral with the cover wall 27 of the second cover configuration 25. In addition, the holding means 40 include a retaining tab 45, which is integrally connected to the cover wall 27 of the second cover configuration 25 via an integral hinge 46.

In the embodiment shown in FIGS. 3 and 4, by analogy with the embodiment shown in FIGS. 1 and 2, insertion or introduction of the cutters 30 and 31 into the holding limbs 41, 42, 43 and 44 is possible in the direction indicated by an arrow 47. After such an insertion of the cutters 30 and 31 in the direction indicated by the arrow 47 the retaining tab 45 is movable into the locking position shown in FIGS. 3 and 4, i.e. it is pivotable about the integral hinge 46, thereby guaranteeing that the cutters 30 and 31, which are held by the holding means 40 of the second cover configuration 25, are retained. With the aid of the retaining tab 45 it is also achieved that with the second cover configuration 25 placed on the first cover configuration 21 the retaining tab 45 guarantees that the cutters 30 and 31 are kept away from the feed-in tube 24, so that even when the two cover configurations 21 and 25 are put together or taken apart the feed-in tube 24 cannot be damaged by one of the two cutters 30 and 31.

Figure 5:
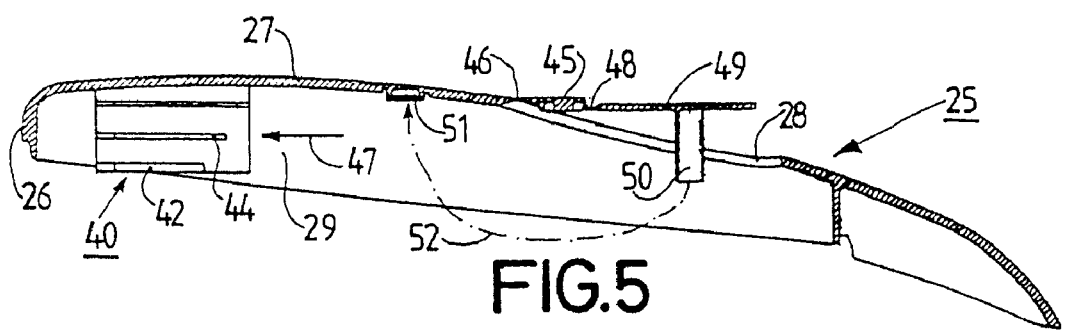
FIG. 5 is a cross-sectional view which shows a first cover configuration of a kitchen appliance in a third embodiment of the invention.

FIG. 5 shows a second cover configuration 25, which is a modification of the second cover configuration 25 shown in FIGS. 3 and 4. In the second cover configuration 25 shown in FIG. 5 the retaining tab 45 is connected to the cover wall 27 via the integral hinge 46, as is also the case with the second cover configuration 25 shown in FIGS. 3 and 4, but in the second cover configuration 25 shown in FIG. 5 a locking tab 49 is additionally connected to the retaining tab 45 via a further integral hinge 48, from which locking tab a hollow cylindrical locking sleeve 50 projects. In addition, a locking recess 51 has been provided in the area of the cover wall 27 of the second cover configuration 25. After insertion of the cutters 30 and 31, which are not shown in FIG. 5, into the holding limbs 41, 42, 43 and 44 of the holding means 40 the locking tab 49 including its locking sleeve 50 is pivoted as shown in FIG. 5 by means of a dash-dot arrow 52, after which the locking sleeve 50 is pressed into the locking recess 51 so as to form a detachable lock, in such a manner that the cutter placed into the second cover configuration 25 and not shown in FIG. 5 is locked against lateral movement with the aid of the retaining tab 45, the retaining tab 45 being retained with the aid of the locking sleeve 50 and the locking recess 51.

The invention is not limited to the embodiments described hereinbefore by way of example. For example, another construction may be chosen in such a manner that accessories of a kitchen appliance can be placed loosely in a hollow space formed between a first cover configuration and a second cover configuration, in which case no holding means or retaining means for these accessories are provided. A modified construction may also include holding means but these holding means are of another construction than described hereinbefore for the respective variants shown in FIGS. 3 and 4 and in FIG. 5. In the two embodiments described hereinbefore the container, in the area of its container rim, and the first cover configuration, in the area of its cover rim, as well as the second cover configuration, in the area of its cover rim, have outer dimensions of the same order of magnitude. This is not necessarily so because the second cover configuration may alternatively have an outer dimension smaller than that of the first cover configuration, in which case the second cover configuration is connected to the first cover configuration in the area of the cover wall of the first cover configuration.

I claim:

1. A kitchen appliance having a container for holding a substance to be processed, which container has a bottom wall and at least a circumferential wall and container rim, which borders an opening for access to a container interior, and having a first cover configuration for closing the container, which first cover configuration has a cover rim, which cooperates with the container, and a cover wall, which covers the access opening at least for the greater part, and in which a second cover configuration has been provided, which second cover configuration has a cover rim and a cover wall, which covers the first cover configuration at least for the greater part, and in which the first cover configuration and the second cover configuration together bound a hollow space, and in which the hollow space serves to and is adapted to accommodate at least one accessory of the kitchen appliance.

2. A kitchen appliance as claimed in claim 1, in which at least one of the two cover configurations has holding means, with the aid of which holding means at least one accessory can be retained.

3. A kitchen appliance as claimed in claim 2, in which the holding means have been arranged on the second cover configuration only.

4. A kitchen appliance as claimed in claim 1, in which the second cover configuration is placed on the first cover configuration and is connected to the first cover configuration.

* * * * *